June 21, 1966   F. STAHLECKER ETAL   3,256,684
DEVICE FOR STOPPING SPINDLES
Filed July 11, 1960                   12 Sheets-Sheet 1

INVENTORS
FRITZ STAHLECKER
JOHANNES SCHURR
BY Dicke, Craig & Freudenberg
ATTORNEYS June 21, 1966   F. STAHLECKER ETAL   3,256,684
DEVICE FOR STOPPING SPINDLES
Filed July 11, 1960   12 Sheets-Sheet 2
Fig. 3.
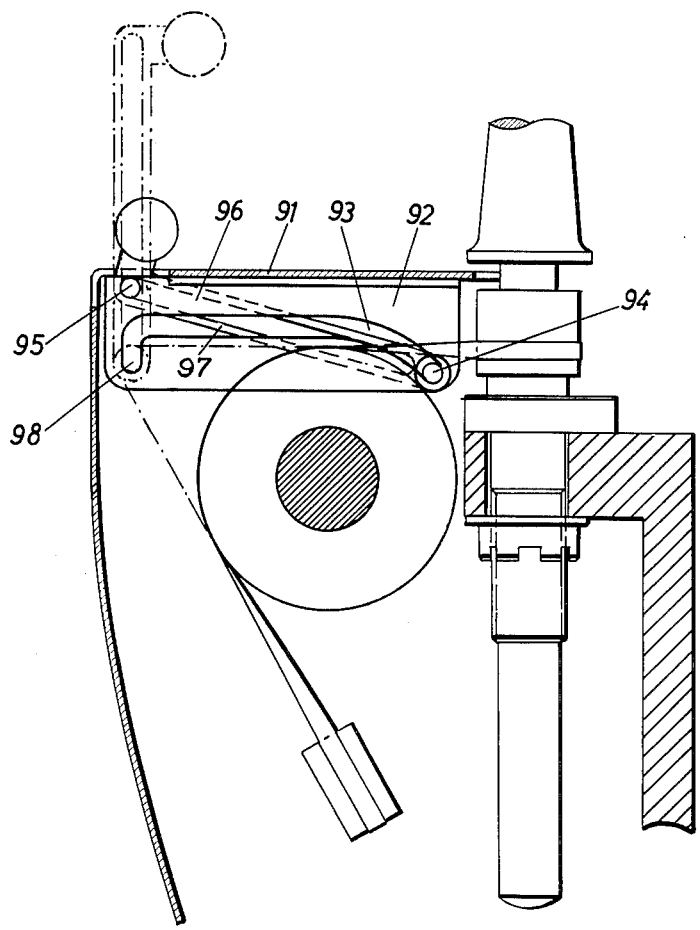
Fig. 11   Fig. 12
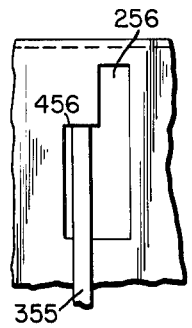 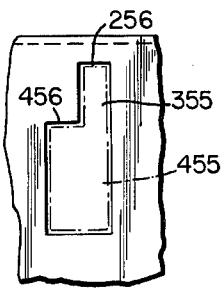
INVENTORS
FRITZ STAHLECKER
JOHANNES SCHURR
BY Dicke, Craig & Freudenberg
ATTORNEYS

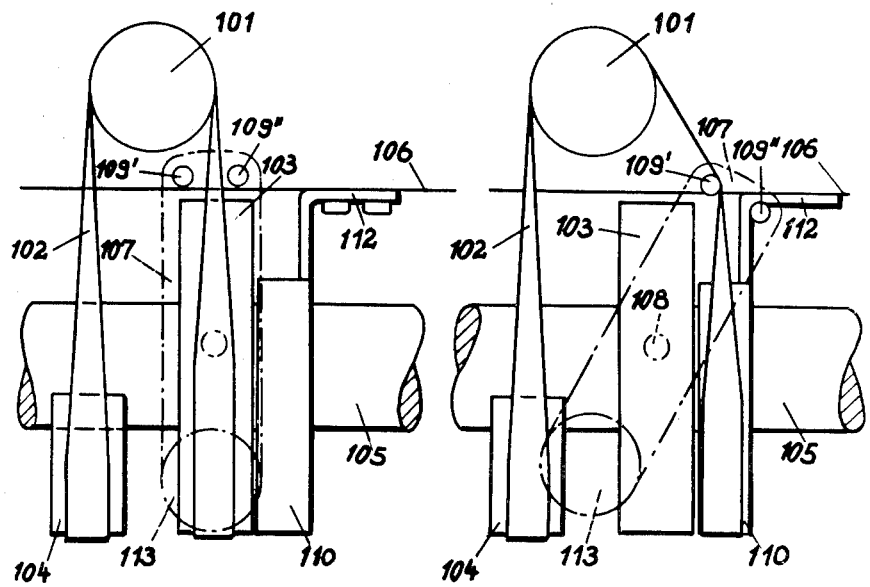

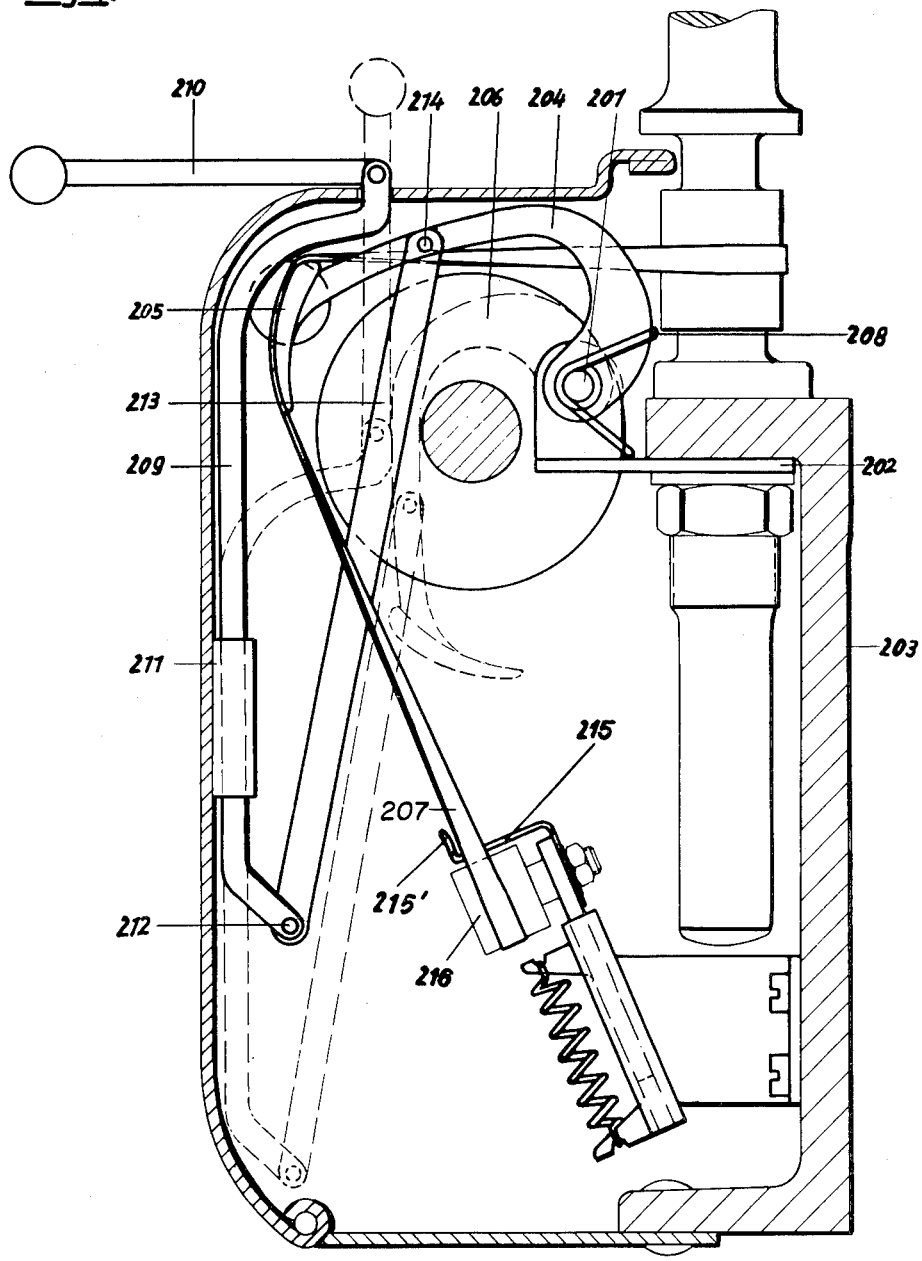

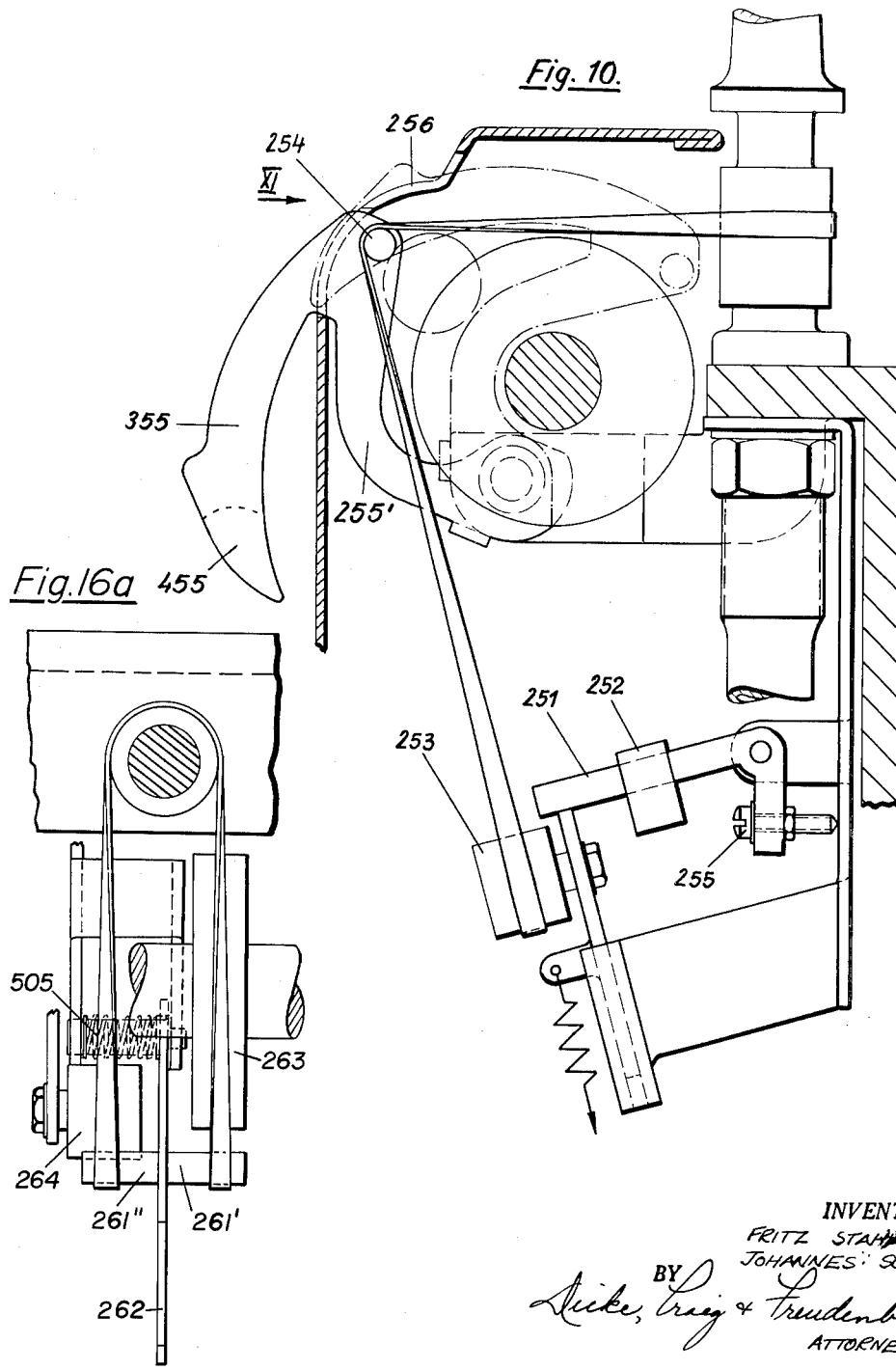

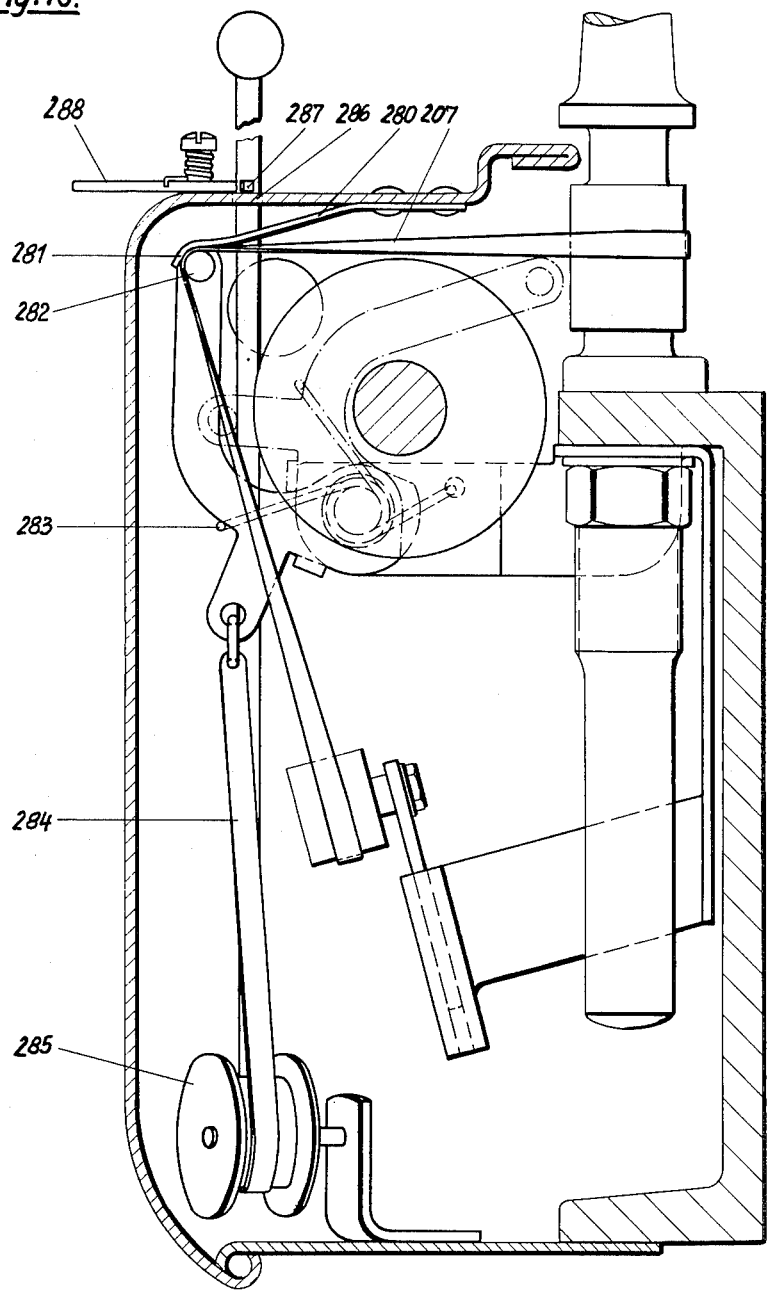

June 21, 1966    F. STAHLECKER ETAL    3,256,684
DEVICE FOR STOPPING SPINDLES

Filed July 11, 1960    12 Sheets-Sheet 8

INVENTORS
FRITZ STAHLECKER
JOHANNES SCHURR
BY
Dicke, Craig & Freudenberg
ATTORNEYS United States Patent Office 3,256,684
Patented June 21, 1966

3,256,684
DEVICE FOR STOPPING SPINDLES
Fritz Stahlecker, Geislingerstrasse 41, Bad Uberkingen, Wurttemberg, Germany, and Johannes Schurr, Donzdorferstr. 46, Suessen, Wurttemberg, Germany
Filed July 11, 1960, Ser. No. 41,907
Claims priority, application Germany, July 11, 1959, W 25,989; Dec. 10, 1959, W 26,862; Jan. 5, 1960, W 27,015; June 18, 1960, W 28,037
19 Claims. (Cl. 57—88)

The present invention relates to a device for stopping the rotation of the spindles of spinning and twisting machines which are driven by a common drive shaft by means of individual belts or cords.

It is conventional in spinning or twisting machines to stop the rotation of the spindles by means of brakes. Whenever such a brake is applied to stop a spindle, the driving cord or belt (both hereafter referred to as a "belt") will be subjected to a considerable friction which may sometimes produce such a high temperature that the solidity of the belt may be seriously affected, especially if it is made of synthetic fibrous materials. It is therefore evident that spindles may be safely stopped by means of such brakes only for short periods.

It has also been previously proposed to provide idler pulleys or special pivotable pulleys which are mounted on the spindle housing and are adapted to receive the continuously moving belt when the spindle is stopped. If the bearings of these pulleys are built for a continuous operation, they are very expensive. If, on the other hand, they are built only for shorter periods of operation, breakdowns must be expected whenever a spindle is stopped for a considerable length of time. Such pulleys also have the additional disadvantage that they require a considerable amount of space which often means that the over-all height of the machine has to be increased.

It is an object of the present invention to provide a device for stopping the rotation of spindles of spinning or twisting machines such as, for example, shown in Schurr et al., Patent No. 2,869,317, which avoids the above-mentioned disadvantages of the known stopping devices and which essentially consists of means for lifting or sliding the driving cords or belts off the drive pulleys on the common drive shaft in order to stop the spindles. Since when applying such devices the belts themselves are stopped by being removed from the drive pulleys, there is no longer any danger that the stopping of the spindles will cause any breakdowns or that the drive belts will be unduly affected. Furthermore, the device according to the invention will not require any increase in the over-all height of the machine.

In order fully to appreciate the importance of the present invention it must be realized that the former practice in spinning mills of piecing broken threads while the operation continues is more and more being discontinued, and that instead the spindles on which the thread is broken are usually stopped so that the whipping effect of the loose end of the thread will be avoided. Consequently, the need for devices which will permit the individual spindles to be stopped for longer periods of time without endangering the machine becomes increasingly prevalent.

A particular feature of the invention for attaining the above-mentioned object consists in the use of a bolt or a segmentally shaped plate which is inserted in the peripheral direction between the drive pulley on the common drive shaft and the belt of each individual spindle in order to lift the belt completely off the pulley.

Instead of providing such means for bodily lifting the driving belts from the drive pulleys by inserting these means between the belts and pulleys, it is also possible according to the invention to provide a stationary slide shoe or the like laterally adjacent to each drive pulley, and a suitable slide member for sliding the driving belt off the drive pulley and on such a slide shoe to stop the rotation of the spindles. Such an embodiment of the invention has the particular advantage that the control lever which is required for operating the stopping device only needs to be moved for a short distance and that the manipulation of the device is therefore very simple and requires very little physical effort.

Since each rotating spindle as well as the parts required for driving the same, such as tension or guide pulleys, have a considerable kinetic energy, it requires a considerable length of time after the driving belt has been lifted or pushed off the drive pulley until the spindle will actually be stopped. In order to reduce this stopping period, the invention further provides in addition to the lifting or sliding means suitable brake means which are adapted to act upon the movable parts which are interposed between the drive pulley and the spindle. A very advantageous feature of the invention further consists in combining the brake means with the lifting means to form a structural unit which may be operated together from a single point.

Additional features of the invention reside in the provision of special control means for manipulating the stopping device according to the invention. According to several embodiments of the invention, these control means may be acted upon by a source of power which, when released, will either shift the stopping device automatically from the braking position to the operative position or, vice versa, from the operative position to the braking position.

The above-mentioned as well as additional objects, features, and advantages of the present invention will become more apparent from the following detailed description thereof, particularly when the same is read with reference to the accompanying drawings, in which—

FIGURE 3 shows a side view of a modification of the invention, in which the belt is lifted off the drive pulley by means of a bolt which is movable in a guide track;

FIGURE 4 shows a top plan view of a further modification of the invention in which the device is provided with a slide shoe laterally of the drive pulley, and in which the device is shown in the operative position while the spindle is being driven;

FIGURE 5 shows a view similar to FIGURE 4, but in which the device is shown in the braking position;

FIGURE 6 shows a side view of the device according to FIGURE 4;

FIGURE 7 shows a side view of a further modification of the invention in which the lifting bolt is made of an elongated segmental shape to serve additionally as a brake for stopping the driving belt;

FIGURE 10 shows a side view of a further modification of the invention, in which a brake action may be exerted upon the driving belt by the application of an additional load upon the tension pulley;

FIGURE 11 shows a view of the opening in the wall of the housing as seen in the direction of the arrow XI in FIGURE 10;

FIGURE 12 shows the position of the brake lever as indicated in FIGURE 10 by dot-and-dash lines;

FIGURE 13 shows a side view of a further modification of the invention, in which a brake action is additionally exerted upon the driving belt by the pressure of a leaf spring;

FIGURE 16a is a top plan view of the device shown in FIGURE 16;

FIGURE 17 shows a side view of a modification of the device according to FIGURE 16 with an electromagnetic release of the spring-loaded brake lever; while

Figure 1:
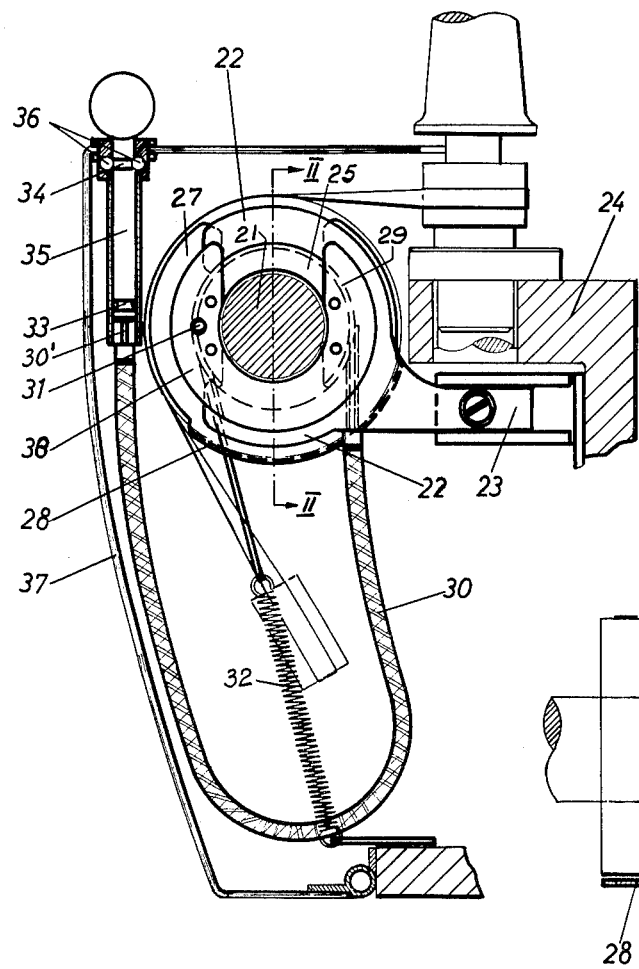
FIGURE 1 shows a side view of a first embodiment of the invention, in which the driving belt is lifted off the drive pulley by means of a segmentally shaped plate which is operated by a Bowden cable.
Figure 2:
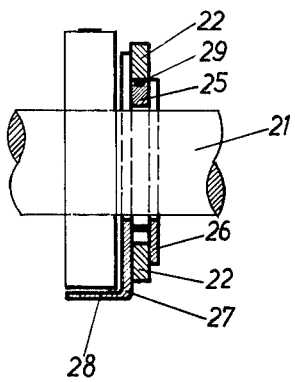
FIGURE 2 shows a cross section taken along line II—II of FIGURE 1.

Referring first to the embodiment of the invention as illustrated in FIGURES 1 and 2, the drive shaft 21 for driving all of the spindles in one row is surrounded by a bushing 22 which is open toward the front side and is bolted at the rear side by a bracket 23 to the spindle frame 24. This bushing 22 supports a slide ring 25 which has a lower opening and is mounted between and secured to guide rings 26 and 27 within bushing 22. Guide ring 27 has a lateral extension 28 of a segmental shape which in the operative position, that is, when the drive belt is in engagement with the drive pulley on shaft 21, is disposed underneath the drive pulley. Slide ring 25 has a groove 29 for receiving the control cable 30' of a Bowden cable 30 which is secured to slide member 25 at 31. At this point 31 there is also connected to the draw strings 38 a counter spring 32 with slide ring 25. The other end of the control cable 30' of the Bowden cable 30 is connected to a control rod 35 with a knob thereon which is provided at its opposite ends with grooves 33 and 34 into which resiliently supported balls 36 are adapted to engage to arrest the control rod in one or the other end position, that is, either in the depressed position in which the belt is in engagement with the drive pulley, or in the retracted position. FIGURE 1 illustrates the position where the belt rests upon the driving pulley. The balls provided for the blocking of the control rod 35 are locked within the groove 34. When the control rod 35 is pulled up, the inner wire 30' of the Bowden cable 30 which is located within the groove 39 of the slide ring 25 will then be pulled into the Bowden cable. Since the inner wire 30' of the Bowden cable is fastened to the slide ring 25 at point 31, slide ring 25 will turn clockwise due to the pull applied to it, while the draw line 38 of spring 32 will wind onto the slide ring 25 creating a restoring force which will tend to turn back the slide ring 25 counterclockwise. Connected with the slide ring 25 is the guide ring 27 with the sheet iron segment 28 attached to it. Because of the turning of slide ring 25 the sheet iron segment 28 will be placed between the belt pulley and the drive pulley, thereby lifting the belt from the belt pulley. When the belt is lifted the position of the slide ring is secured by the groove 33 because the balls 36 will engage the groove when the control rod is pulled up. As will be clearly seen in FIGURE 1, due to the flexibility of the Bowden cable 30, the belt-lifting device does not interfere with the pivotability of the housing cover 37 on which the control rod 35 is also mounted.

If the tension pulley of the driving belt permits the belt to be lifted to a considerable extent from the drive pulley, it is in many cases also possible to lift the belt from the drive pulley by means of a simple bolt rather than by a lifting segment. This is illustrated, for example, in FIGURE 3, in which the cover plate 91 of the housing carries a cam plate 92 with a cam slot 93 therein in which a bolt 94 is slidable which is secured at one end of a control rod 97. This control rod 97 has a longitudinal slot 96 in which a pin 95 engages which is rigidly secured to cover plate 91. By pulling the control rod 97 forwardly from its full-line position as shown in FIGURE 3, and then pivoting it to the vertical position as shown in dot-and-dash lines, bolt 94 will be moved forwardly along cam slot 96 until it will be arrested in the downwardly extending end of the slot. By this movement, bolt 94 engages between the drive pulley and the belt and lifts the latter completely off the pulley.

According to the embodiment as illustrated in FIGURES 4 to 6, the rotation of spindle 101, which in the operative position is driven by a belt 102 which runs from spindle 101 over drive pulley 103 and then over a tension pulley, not shown, back to spindle 101, may be stopped by sliding the belt laterally off the drive pulley and upon a slide shoe 110 which is secured directly adjacent to drive pulley 103 on the spindle frame 106 by means of an angle iron 112. The slide surface 111 of slide shoe 110 forms a part of a cylinder of a diameter substantially equal to the diameter of drive pulley 103. Drive pulley 103 which is secured to the common drive shaft 105 which extends along the length of spindle frame 106 is mounted as closely as possible to frame 106.

For sliding the driving belt 102 off the drive pulley 103 and on the slide shoe 110 and vice versa, a two-armed lever 107 is pivotably mounted on a stationary pin 108 at a point above the level of the axis of drive pulley 103. At one end facing toward spindle 101, lever 107 has a pair of guide bolts 109' and 109" secured thereto which in the operative position, as shown in FIGURE 4, are disposed at both sides of belt 102 without engaging the same. At the other end, lever 107 has a control knob 113 which is disposed in an easily accessible position. When spindle 101 is to be stopped, lever 107 is pivoted about pin 108 from its position shown in FIGURE 4 to that shown in FIGURE 5, whereby guide bolt 109' will engage with belt 102 and slide the same upon the stationary slide shoe 110. When spindle 101 is again to be started, lever 107 is pivoted back to its original position, whereby guide bolt 109" engages with belt 102 and pushes the same back upon drive pulley 103.

Although when using either of the belt lifting or shifting devices according to the invention as previously described there is no absolute necessity to provide a special spindle brake, it is advisable to do so in order to permit the spindle after being lifted or slipped off the drive pulley to be stopped more quickly. These additional brake means are preferably combined with the belt-lifting device so as to be operated simultaneously with the latter.

Thus, according to the embodiment as shown in FIGURE 7, a bracket 202 which is mounted on the spindle frame 203 carries a bolt 201 on which a brake arm 204 is rotatably mounted which is shown in the braking position. In place of a lifting bolt as shown in FIGURE 3, this brake arm 204 carries at one side a flat curved member 205 which, if desired, may also be provided with a suitable brake lining which exerts a good braking action upon the driving belt without, however, harming the belt. However, the increased brake surface of this member 205 as compared with the surface of a bolt is generally sufficient to eliminate the kinetic energy of the moving parts very quickly. In order to start the spindle, brake arm 204 must be pivoted in a counterclockwise direction until belt 207 again engages fully with drive pulley 206 and brake member 205 no longer engages with the belt and is in the position as indicated in dotted lines. For lifting the belt off the drive pulley 206 and for exerting a brake action on the belt, a connecting rod 213 is pivotably connected at one end by a pin 214 to brake arm 204 and at the other end by a pin 212 to another rod 209 which is slidable within a bushing or the like 211 which is secured to the front wall of the housing cover. When brake arm 204 is pivoted upwardly to the position shown in full lines in FIGURE 7, in which the belt is lifted off drive pulley 206, the upper end of rod 209 on which a control rod 210 is pivotably mounted extends through an aperture in the upper wall of the housing cover, and control rod 210 can then pivot forwardly and thereby lock the rods 209 and 213 and brake arm 204 in the raised or braking position. In order to release the brake and return the driving belt upon the rotating drive pulley 206 to start the spindle, it is merely necessary to pivot the control rod 210 to a vertical position. Due to the gravity of rods 209, 210, and 213 and the action of a spring 208 which tends to turn brake arm 204 in a counterclockwise direction, these rods can then slide downwardly and thereby pivot brake arm 204 downwardly and completely out of engagement with belt 207. In this released position of the brake, as indicated in dotted lines, the pivot point 212 of rod 213 on the lower end of rod 209 will be disposed closely adjacent to the hinge of the housing cover so that if the cover is to be opened by being pivoted downwardly, rod 209 will also pivot about pin 212 without affecting the position of brake arm 204.

In order to prevent the driving belt 207 from sliding off the tension pulley 216 while being lifted off the drive pulley, suitable belt guiding means may be provided near tension pulley 216, for example, in the form of a bracket 215 with a guide member 215' thereon which has a width so as to prevent both strands of the belt from falling off the tension pulley 216.

Figure 8:
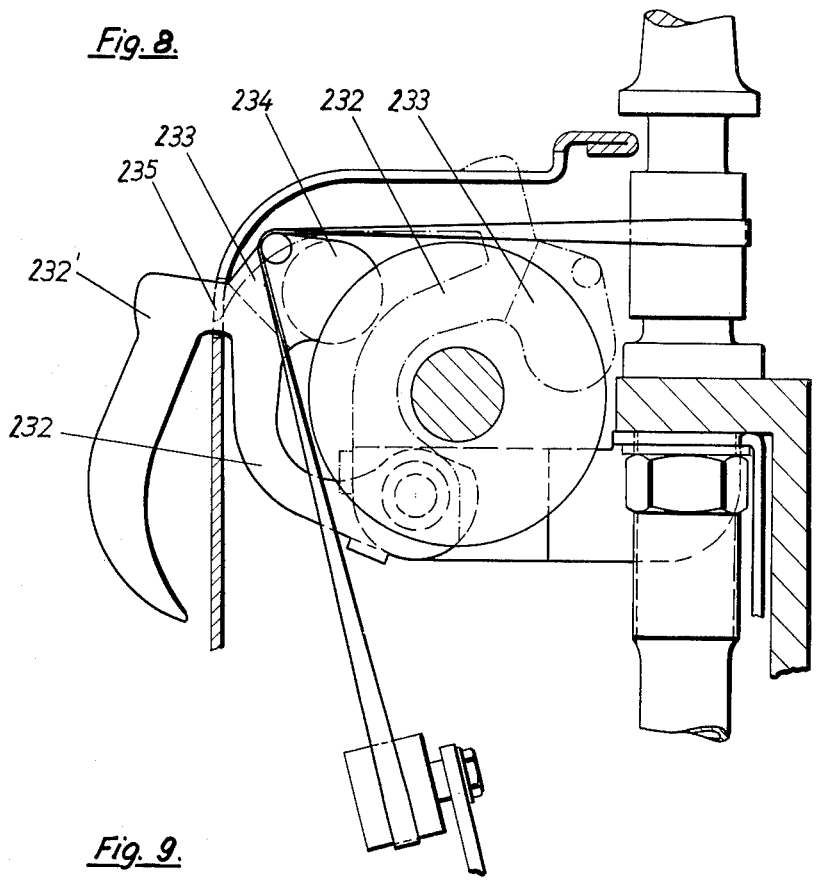
FIGURE 8 shows a side view of another modification of the invention, in which the brake lever is additionally provided with a brake lining to act upon the guide pulley.
Figure 9:
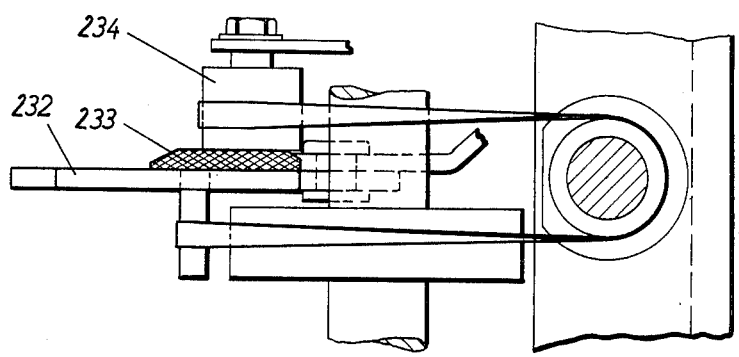
FIGURE 9 shows a top plan view of the device according to FIGURE 8.

According to the further embodiment of the invention as shown in FIGURES 8 and 9, the control lever 232 has laterally mounted thereon a brake lining 233. When lever 232 is in the position as indicated in FIGURE 8 in dot-and-dash lines in which no braking action is exerted upon the spindle, the brake lining 233 is not in engagement with any moving parts. If, however, lever 232 is moved to the position shown in FIGURES 8 and 9 in full lines in which the belt is lifted off the driving pulley, brake lining 233 engages with the end surface of guide pulley 234 and thereby exerts an additional braking action thereon. As shown in FIGURE 9, brake lining 233 is preferably provided with an inclined surface so that, if lever 232 is provided in the form of a plate spring, the lateral pressure of brake lining 233 against guide pulley 234 will occur automatically. It is, however, also possible to design the brake lever 232 so as to permit the brake lining to be pressed manually against the guide pulley. For operating the brake lever, the same is provided with a control handle 232' which is guided by the walls of a slot 235 in the cover of the housing and is made of a shape in accordance with the curvature of the cover so that, when brake lever 232 is pivoted upwardly and the spindle is running, slot 235 will be covered by the control handle 232'.

In the further embodiment of the invention according to FIGURE 10, a lever 251 is pivotably mounted on the spindle frame and loaded by a weight 252. The free end of this lever acts upon the tension pulley 253 when it is lifted due to the lifting of the belt off the drive pulley. This increases the tension of the belt and thus the friction thereof on lifting bolt 254. This additional friction of the belt depends upon the position of tension pulley 253, that is, upon the length o fthe particular belt. In order to compensate for differences in the length of the belt, the position of the loading lever 251 may be adjusted by a setscrew 255.

Brake lever 255' also has a control handle 355 with an enlarged end 455. Handle 355 is shaped so as to close the slot 256 in the cover at least substantially. The enlarged end 455 then closes the wider part 356 of slot 256, as indicated in FIGURE 12, which illustrates the position of the brake lever shown in FIGURE 10 by dot- and-dash lines. When pivoted to the braking position, brake lever 255' is shifted laterally underneath the edge 456 of the slot and is thereby arrested in this position as shown in FIGURE 11. For loosening the brake, control handle 355 is shifted laterally back either by hand or with the knee so as to slide off the edge 456, whereupon lever 255' will pivot back automatically to the operative position. Edge 456 may be outwardly beveled so that lever 255' will always slide to the outer edge of the wider part 356 of the opening 256 and will not be able to slide back of its own accord to the operative position. Brake lever 255' including handle 355 and the enlarged end portion 455 may be inexpensively made of one piece of material.

In order to facilitate or avoid entirely the manual or knee operation of brake lever 255', the same may also be acted upon by a spring which automatically urges it into the arrested position when pivoted to the braking position.

In the belt-lifting device according to FIGURE 13, a plate spring 280 is mounted on the cover of the housing and has a curved end portion 281 in which the lifting bolt 282 is arrested when the control lever which is acted upon by a spring 283 reaches its end position. An additional braking action is then exerted upon belt 207 by spring 280 pressing the belt upon bolt 282. The control lever is acted upon by a draw strap 284 which passes around a pulley 285 which is disposed at a point closely adjacent to the hinge of the cover. The other end of draw strap 284 passes at 286 through the upper wall of the cover and terminates in a knob. At 287, the draw strap is further provided with an aperture into which a detent on a spring-loaded lever 288 engages when strap 284 is drawn upwardly. If lever 283 is then pivoted, for example, by the knee of the operator, the brake will be released and the belt will be reapplied by spring 283 upon the drive pulley.

Figure 14:
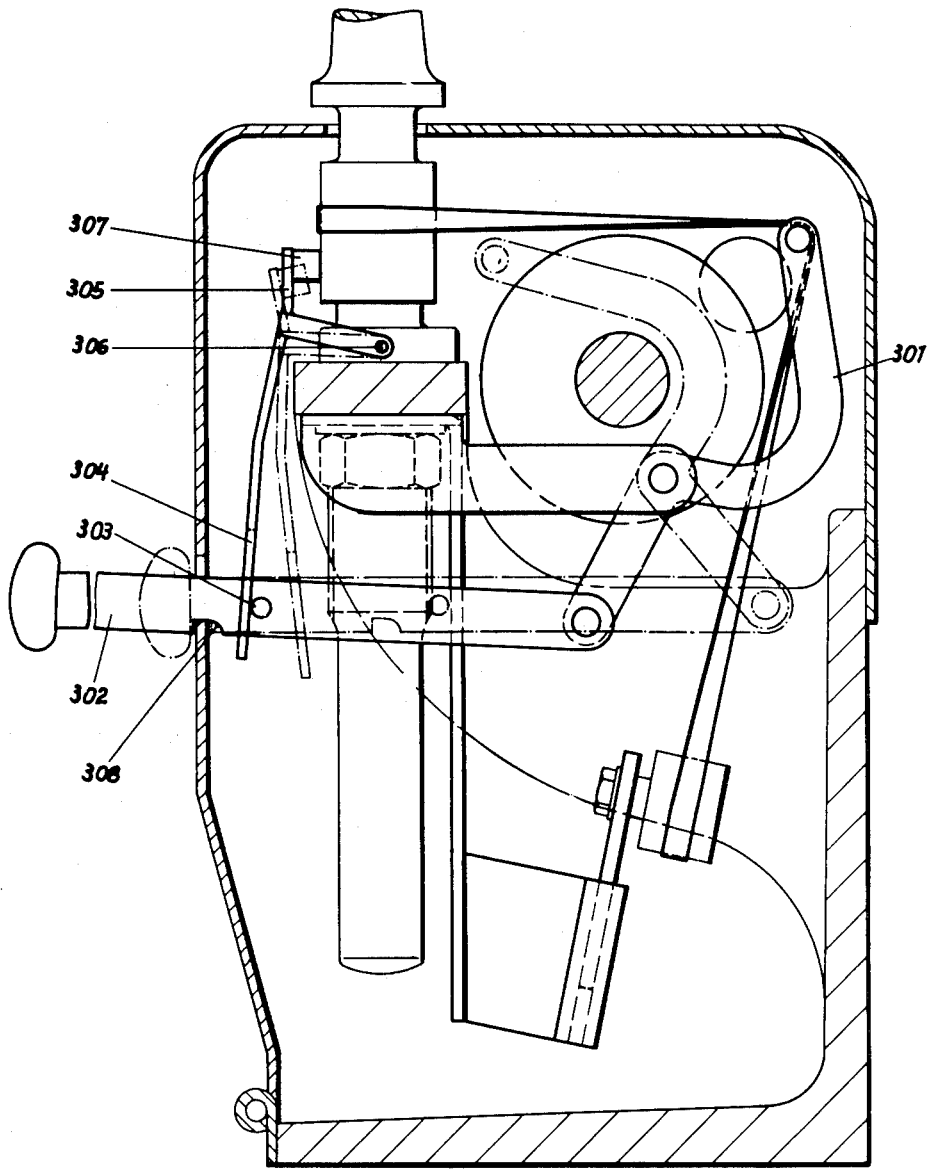
FIGURE 14 shows a side view of another modification of the invention, in which the belt-lifting device is operatively associated with a brake which acts directly upon the spindle.

FIGURE 14 shows a belt-lifting device in which the drive pulley is located closely behind the spindle and the belt-lifting lever 301 is operated by a push-pull rod 302. This push-pull rod has a pin 303 which, when the belt is lifted off the drive pulley, presses against the lower slotted end of a spring arm 304 of brake lever 305 which is pivotable about an axis 306. Brake shoe 307 is thus pressed resiliently against the spindle pulley when the belt is lifted therefrom. By providing push-pull rod 302 with a locking recess 308, it may be arrested in the drawn-out position on an edge of an aperture in the wall of the cover.

Figure 15:
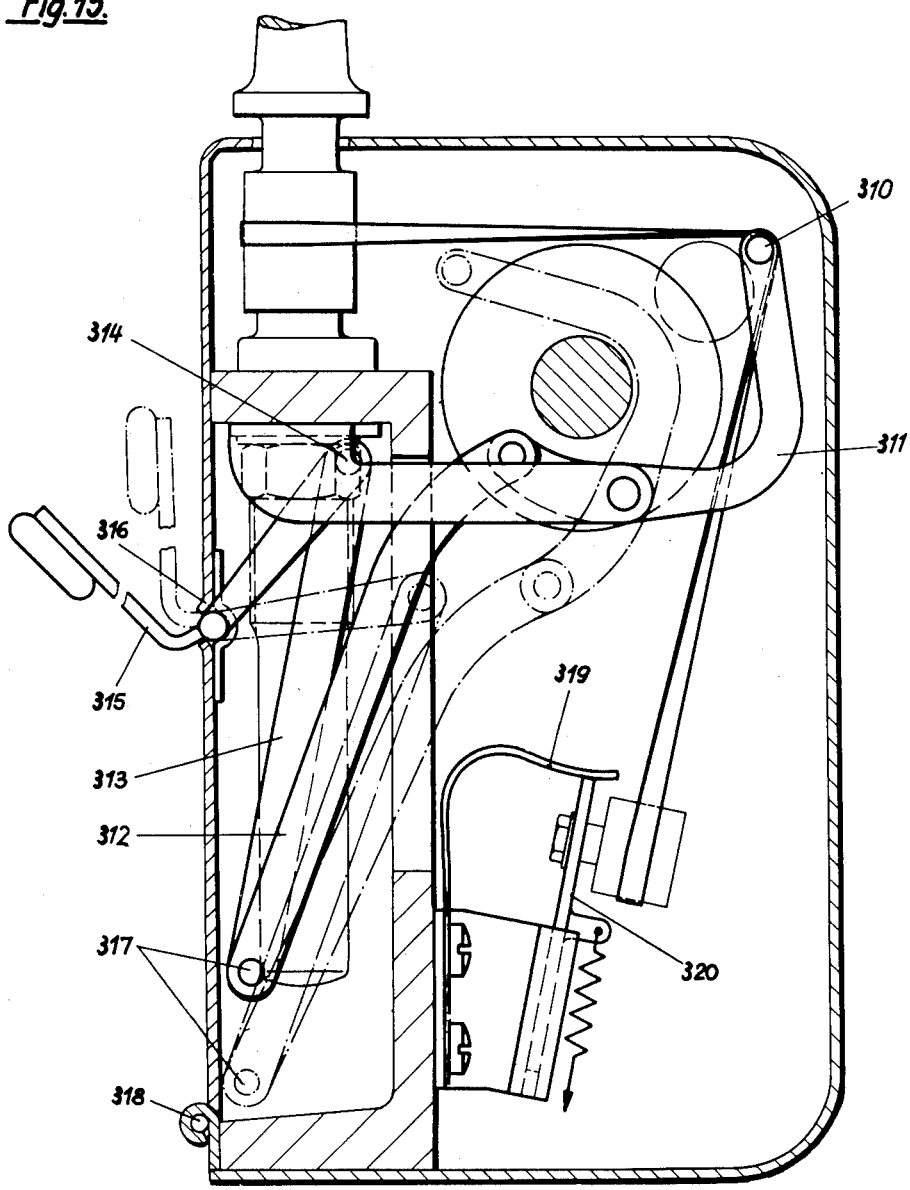
FIGURE 15 shows a side view of a further modification of the invention with a spring acting upon the tension pulley.

In the further modification of the belt-lifting device according to the invention as illustrated in FIGURE 15, a leaf spring 319 is provided which presses upon the guide 320 of the tension pulley when the latter has been lifted in accordance with the extent at which the belt is lifted from the drive pulley. This increases the tension of the belt and thus also the braking action which is exerted thereon by the lifting bolt 310. Brake lever 311 may be actuated by a connecting rod 312 which, in turn, is connected to the lower end of a rod 313, the upper end of which is pivotably connected at 314 to an angular lever 315 which is pivotably mounted at 316 on the front wall of the cover. For applying the brake to stop the rotation of the spindle, the angular lever 315 is pivoted forwardly by hand to the position shown in full lines, while for disengaging the brake, lever 315 is pressed, for example, by a knee toward the front wall of the cover to the position indicated in dot-and-dash lines. Since by this movement the pivot point 317 between rods 312 and 313 is shifted to a position immediately adjacent to the hinge 318 of the cover, the latter may be easily opened without affecting the position of brake lever 311. If the prevailing conditions permit the angular lever 315 to be mounted at a lower point, it may be possible to omit the connecting rod 313.

Figure 16:
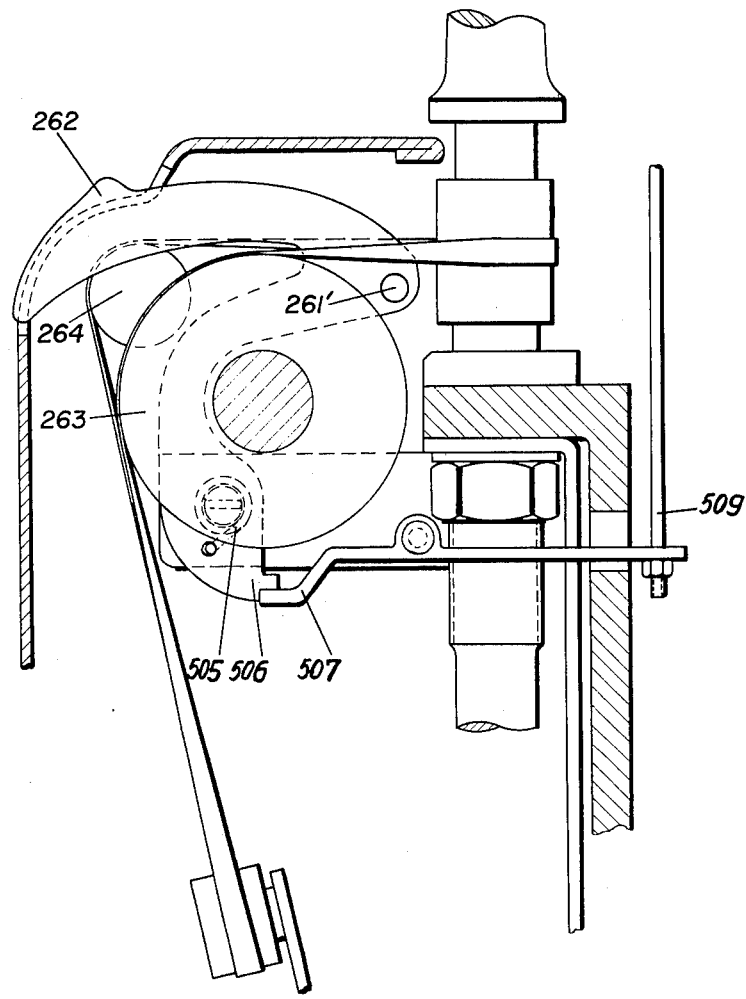
FIGURE 16 shows a side view of another modification with a spring-tensioned brake lever and a mechanical release therefor.

In the further embodiment according to FIGURES 16 and 16a, the brake lever 262 carries bolt member 261' adapted to engage the belt passing over drive pulley 263 and guide pulley 264. This brake lever is acted upon by a spring 505 and has on its lower end a locking recess 506 which, when the spindle is driven, is in locking engagement with a pawl 507 on one end of a lever which carries on its other end a control rod 509. When this control rod 509 is pulled upwardly, pawl 507 will disengage from the locking recess 506, so that under the action of spring 505 brake lever 262 can pivot into the belt-lifting or braking position. The belt-lifting bolt, illustrated in FIG. 16a, projects from both sides of control lever 262, so that bolt portion 261' passes underneath the belt strand which lies on drive pulley 263, while bolt portion 261" passes underneath the belt strand which lies on guide pulley 264 so as to effect simultaneous lifting of the belt from these pulleys. This arrangement is obviously also applicable to the embodiments of FIGURES 10, 13, 14, 15, 17 and 18.

Figure 17:
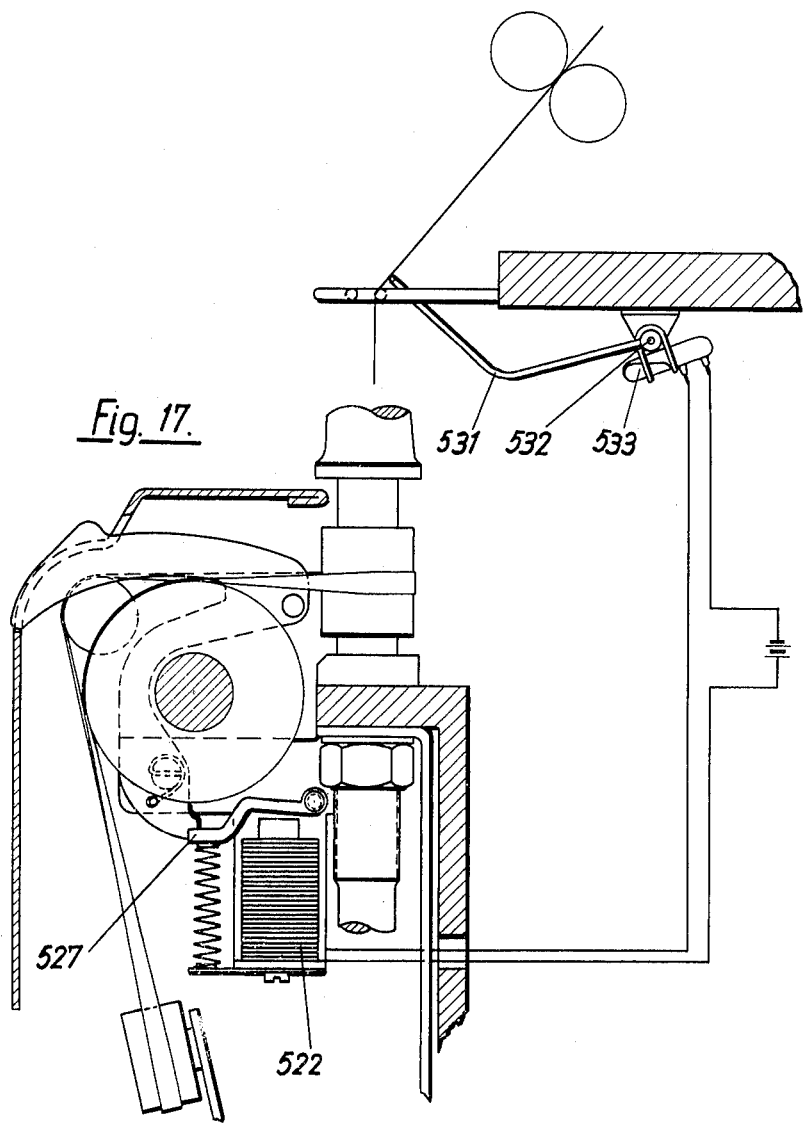

FIGURE 17 shows a belt-lifting device similar to that shown in FIGURE 16, in which, however, the pawl 527 is operated by an electromagnet 522 which is controlled by a mercury contact tube 533. This tube is mounted on a thread guide 531 and is pivotable with the latter about the axis 532. If the thread passing to or from the spindle should break, the contact tube 533 will be pivoted so that electromagnet 522 will be energized. Pawl 527 will then disengage from the brake lever, permitting the latter under the action of its spring to pivot in a counterclockwise direction so as to lift the belt off the drive pulley.

Figure 18:
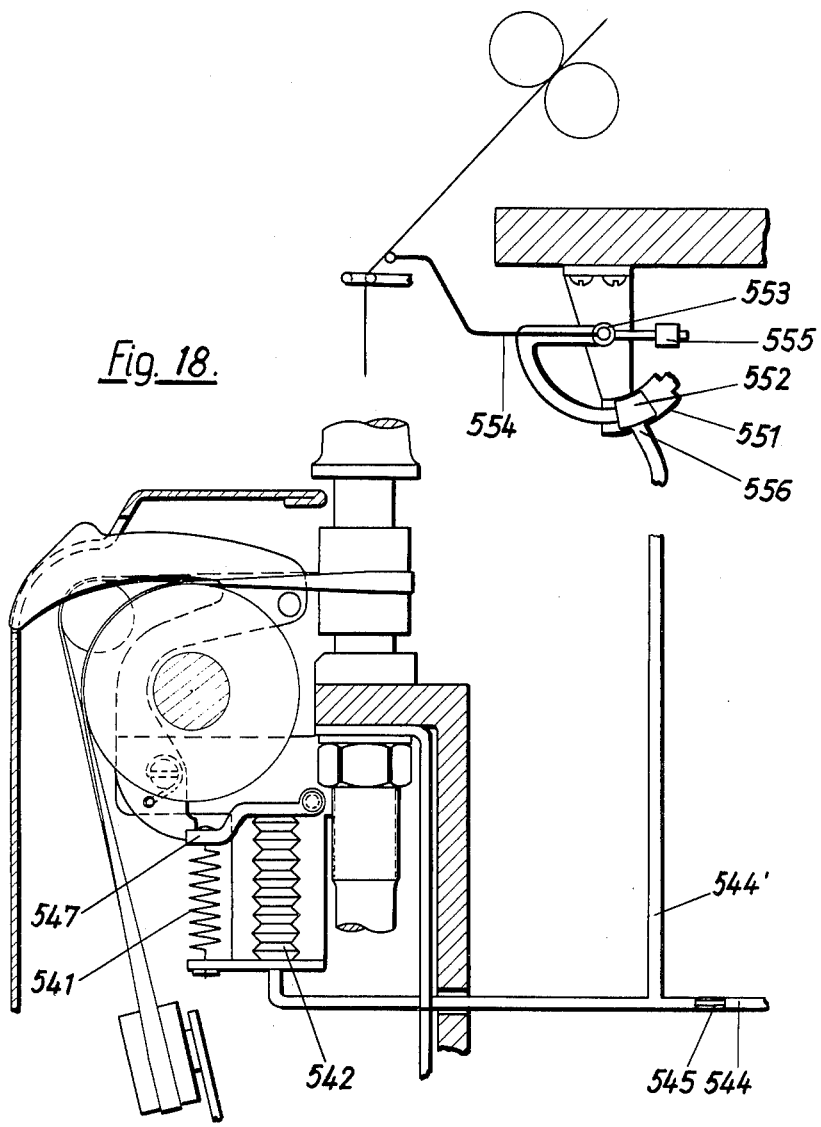
FIGURE 18 shows a side view of still another modification of the device according to FIGURE 16 with a pneumatic release of the spring-loaded brake lever.

FIGURE 18 finally shows an arrangement similar to FIGURE 17, in which, however, the pawl 547 is operated pneumatically to release the brake lever. Pawl 547 is acted upon by a spring 541 which tends to pull the pawl out of its locking engagement with the locking recess on the brake lever. This action is opposed by a bellows 542 which is held in the expanded position by compressed air from a pressure line 544 which is controlled by a throttle valve 545. Between valve 545 and bellows 542 a branch line 544' is connected to pressure line 544 and leads to a segmentally shaped cylinder 551 which is open at its rear end and the inlet opening 556 of which is adapted to be closed by a piston 552 which is mounted on one end of a curved piston rod. The other end of this piston rod is pivotally mounted at 553 and extended beyond this pivot point by an arm which carries a counterweight 555. Furthermore, a thread guide 554 is rigidly secured to the piston rod. In the event that the thread leading to or from the spindle might break, counterweight 555 will pivot downwardly and piston 552 will thereby free the opening 556, permitting the air in bellows 542 to escape and spring 541 to become active to release pawl 547 from the brake lever so that the latter can lift the belt from the drive pulley to stop the further rotation of the spindle. Pawl 547 will remain in its downwardly pivoted position until the thread breakage is repaired and thread guide 554 is again connected to the thread so that piston 552 will again close the opening 556, permitting the compressed air passing through throttle valve 545 again to fill the bellows 542.

Although our invention has been illustrated and described with reference to the prefered embodiments thereof, we wish to have it understood that it is in no way limited to the details of such embodiments, but is capable of numerous modifications within the scope of the appended claims. Especially, the features of some of the embodiments as described and illustrated may be applied to others in order to increase the brake action upon the belt and the other driven parts so as to stop the rotation of the spindle as quickly as possible.

Having thus disclosed our invention, what we claim is:

1. In a spinning or twisting machine having a plurality of spindles, each spindle being provided with a driving pulley, a guide pulley, a tension pulley, and a driving belt running over said pulleys in engagement therewith and operatively connecting said spindle to said pulleys for driving rotation thereof, the axes of said driving pulley and said guide pulley being parallel and the axis of said tension pulley being transversely disposed to the axis of said driving pulley, lifting means for substantially simultaneously lifting said driving belt out of engagement with said driving pulley and said guide pulley.

2. Apparatus according to claim 1, further comprising a single lever to actuate said lifting means for lifting said driving belt out of engagement with said driving pulley and said guide pulley.

3. Apparatus according to claim 2, wherein said lifting means is capable of rotation about an axis parallel to and offset from the axis of said driving pulley.

4. Apparatus according to claim 1, wherein said lifting means consists primarily of a bolt and a lever rod for moving the bolt transversely to the direction of the driving pulley axis into engagement with said driving belt so as to lift said belt.

5. Apparatus according to claim 4, wherein during actuation of said lifting means said bolt simultaneously lifts those portions of said driving belt running at said driving pulley and at said guide pulley.

6. Apparatus according to claim 5, wherein said lifting bolt is provided with first and second portions extending respectively on either side of said lever rod.

7. Apparatus according to claim 1, including brake means connected to said lifting means and actuated simultaneously therewith for braking rotation of at least one of said spindle and pulleys.

8. Apparatus according to claim 7, wherein said brake means acts upon said spindle.

9. In a spinning or twisting machine having a frame, a plurality of spindles rotatably mounted on said frame parallel to each other, a common drive shaft extending transverse to said spindles, a plurality of drive pulleys on said shaft, a plurality of guide pulleys each associated with one of said drive pulleys and one of said spindles, an individual flat driving belt for each of said spindles connecting each of said spindles with one of said guide pulleys and normally engaging with one of said drive pulleys to rotate said spindle, and means for disengaging said belt from said drive pulley by substantially simultaneously lifting said driving belt out of engagement with said driving pulley and said guide pulley and for then receiving said belt so as to stop the rotation of said spindle, said guide pulleys, spindles, and drive pulleys comprising outer peripheral belt-engaging surfaces, said belt-disengaging means comprising a belt-disengaging member extending substantially transversely of, but spaced from, said peripheral belt-engaging surface of said drive pulley, and means for moving said member in an arcuate path from a first position out of engagement with said belt to a second position between said outer peripheral belt-engaging surface of said drive pulley and said guide pulley and said belt and in engagement with said belt to disengage said belt completely from said drive pulley and said guide pulley, said means for moving said member further comprising a source of power acting upon said member and tending to move said member from one of said positions to the other position, and releasable means for maintaining said member in said one position and for releasing it to move to the other position.

10. The combination according to claim 9, in which said source of power comprises a spring acting upon and tending to press said member to its inoperative position in which said spindle is being driven, a control member connected to said belt-disengaging member for operating the same, said releasable means being adapted to arrest said control member in its belt-disengaging position.

11. The combination according to claim 9, in which said source of power comprises a spring acting upon and tending to press said member to its operative, belt-disengaging position, a control member connected to said belt-disengaging member for operating the same, said releasable means being adapted to arrest said control member in its inoperative position in which said spindle is driven.

12. The combination according to claim 11, in which said releasable means comprises a rod adapted to engage with said control member to arrest said control member and said belt-disengaging member in said inoperative position, said rod adapted to be moved so as to disengage from said control member to permit said belt-engaging member to be moved by said spring to said belt-disengaging position.

13. In a spinning or twisting machine having a frame, a plurality of spindles rotatably mounted on said frame parallel to each other, a common drive shaft extending transverse to said spindles, a plurality of drive pulleys on said shaft, a plurality of idler pulleys each associated with one of said drive pulleys and one of said spindles, a driving belt for each of said spindles connecting each of said spindles with one of said idler pulleys and normally engaging with one of said drive pulleys to rotate said spindle, and means pivotable about an axis parallel and offset from the axis of said driving pulley for disengaging said belt from said drive pulley and for then receiving said belt so as to stop the rotation of said spindle, said idler pulley comprising a tension pulley resiliently mounted on said frame for maintaining said belt under tension, and means acting upon said tension pulley, only when said belt-disengaging means is actuated to disengage said belt from said drive pulley, to increase the tension of said belt and thus the friction of said belt on said belt-disengaging means.

14. In a spinning or twisting machine having a frame, a plurality of spindles rotatably mounted on said frame parallel to each other, a common drive shaft extending transverse to said spindles, a plurality of drive pulleys on said shaft, a plurality of idler pulleys each associated with one of said drive pulleys and one of said spindles, an individual flat driving belt for each of said spindles connecting each of said spindles with one of said idler pulleys and normally engaging with one of said drive pulleys to rotate said spindle, and means for disengaging said belt from said drive pulley and for then receiving said belt so as to stop rotation of said spindle, a housing mounted on said frame and substantially enclosing said device, said housing having an elongated aperture, and a control handle connected to said belt-disengaging means and extending into and partly through said aperture, said handle having a shape substantially in accordance with the part of the housing adjacent to said aperture and adapted substantially to close said aperture when said handle is in the position in which said belt-disengaging means are inoperative and said spindle is being driven, one side wall of said aperture having a locking recess therein into which said control handle may be inserted by lateral movement thereof to arrest the same in the belt-disengaging position thereof.

15. In a spinning or twisting machine having a frame, a plurality of spindles rotatably mounted on said frame parallel to each other, a common drive shaft extending transverse to said spindles, a plurality of drive pulleys on said shaft, a plurality of idler pulleys each associated with one of said drive pulleys and one of said spindles, an individual flat driving belt for each of said spindles connecting each of said spindles with one of said idler pulleys and normally engaging with one of said drive pulleys to rotate said spindle, and means for disengaging said belt from said drive pulley and for then receiving said belt so as to stop the rotation of said spindle, said idler pulleys, spindles, and drive pulleys comprising outer peripheral belt-engaging surfaces, said belt-disengaging means comprising a belt-disengaging member extending substantially transversely of, but spaced from, said peripheral belt-engaging surface of said drive pulley, and means for moving said member in an arcuate path from a first position out of engagement with said belt to a second position between said outer peripheral belt-engaging surface of said drive pulley and said belt and in engagement with said belt to disengage said belt completely from said drive pulley, a control member, said belt-disengaging member secured to and projecting from both sides of said control member and adapted to engage with the strand of said belt on said drive pulley and simultaneously with the strand of said belt on said idler pulley to lift both strands off said drive and idler pulleys.

16. In a spinning or twisting machine having a frame, a plurality of spindles rotatably mounted on said frame parallel to each other, a common drive shaft extending transverse to said spindles, a plurality of drive pulleys on said shaft, a plurality of guide pulleys each associated with one of said drive pulleys and one of said spindles, an individual flat driving belt for each of said spindles connecting each of said spindles with one of said guide pulleys and normally engaging with one of said drive pulleys to rotate said spindle, and means for disengaging said belt from said drive pulley by substantially simultaneously lifting said driving belt out of engagement with said driving pulley and said guide pulley and for then receiving said belt so as to stop the rotation of said spindle, said guide pulleys, spindles, and drive pulleys comprising outer peripheral belt-engaging surfaces, said belt-disengaging means comprising a belt-disengaging member extending substantially transversely of, but spaced from, said peripheral belt-engaging surface of said drive pulley, and means for moving said member in an arcuate path from a first position out of engagement with said belt to a second position between said outer peripheral belt-engaging surface of said drive pulley and said guide pulley and said belt and in engagement with said belt to disengage said belt completely from said drive pulley and said guide pulley, friction producing means for quickly stopping the rotation of said spindle when said belt is disengaged from said drive pulley, said belt-disengaging member being constituted by a lever, means for operating said lever comprising a push-pull rod, said friction producing means comprising a brake lever having a brake shoe thereon disposed adjacent said outer peripheral surface of said spindle, a pin member on said push-pull rod operable to engage said lever to move said brake shoe into engagement with said last-mentioned peripheral surface upon movement of said belt-disengaging member to said second position.

17. In a spinning or twisting machine having a frame, a plurality of spindles rotatably mounted on said frame parallel to each other, a common drive shaft extending transverse to said spindles, a plurality of drive pulleys on said shaft, a plurality of idler pulleys each associated with one of said drive pulleys and one of said spindles, an individual flat driving belt for each of said spindles connecting each of said spindles with one of said idler pulleys and normally engaging with one of said drive pulleys to rotate said spindle, and means for disengaging said belt from said drive pulley and for then receiving said belt so as to stop the rotation of said spindle, said idler pulleys, spindles, and drive pulleys comprising outer peripheral belt-engaging surfaces, said belt-disengaging means comprising a belt-disengaging member extending substantially transversely of, but spaced from, said peripheral belt-engaging surface of said drive pulley, and means for moving said member in an arcuate path from a first position out of engagement with said belt to a second position between said outer peripheral belt-engaging surface of said drive pulley and said belt and in engagement with said belt to disengage said belt completely from said drive pulley, said belt-disengaging member having a portion thereof engageable with the strand of said belt on said idler pulley to lift said strand off of said idler pulley upon movement of said member from said first position to said second position.

18. Apparatus according to claim 13, wherein said means acting upon said tension pulley comprises a lever and weight means adjustably positioned with respect to said tension pulley for increasing the tension on said belt by restricting movement of said tension pulley after said belt-disengaging means has been actuated to a predetermined extent.

19. Apparatus according to claim 13, wherein said means acting upon said tension pulley comprises spring means positioned with respect to said tension pulley so as to provide increasing tension on said belt by increasingly restricting movement of said tension pulley with increased actuation of said belt-disengaging means.

References Cited by the Examiner

UNITED STATES PATENTS

| 1,800,784 | 4/1931 | Durand | 57—88 |
|---|---|---|---|
| 2,869,317 | 1/1959 | Schurr et al. | 57—105 |
| 2,953,894 | 9/1960 | Stahlecker et al. | 57—105 |

FOREIGN PATENTS

| 2,371 | 1914 | Great Britain. |
|---|---|---|
| 23,714 | 1913 | Great Britain. |
| 147,325 | 9/1931 | Switzerland. |

OTHER REFERENCES

Mortl: German application 1,015,294, printed September 5, 1957 (kl. 47h–9).

Mortl: German application 1,042,331, printed October 30, 1958 (kl. 47h–9).

MERVIN STEIN, *Primary Examiner.*

RUSSELL C. MADER, *Examiner.*

J. PETRAKES, R. R. MACKEY, *Assistant Examiners.*